April 20, 1926.
H. F. ROACH
1,581,659
ANAMORPHOUS TOTAL REFLECTING PRISM
Filed June 27, 1924     2 Sheets-Sheet 1
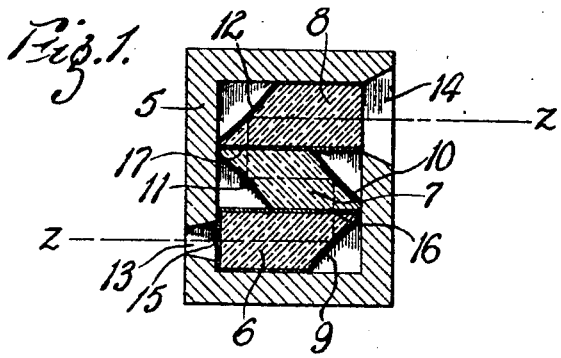
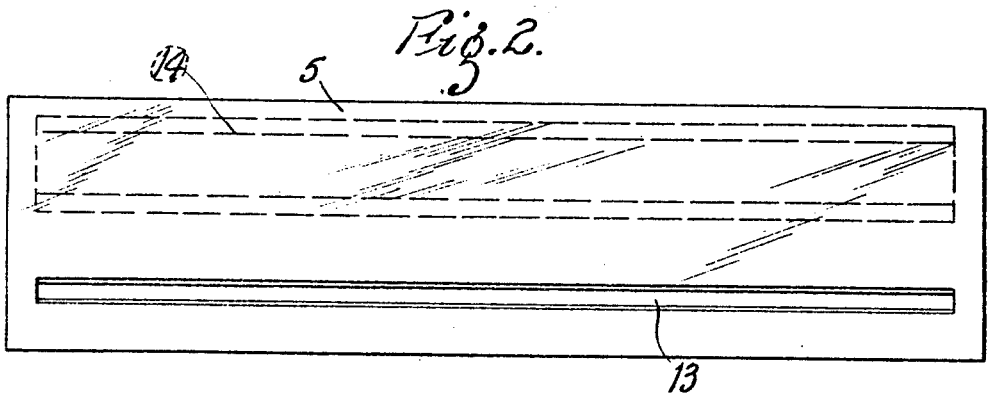
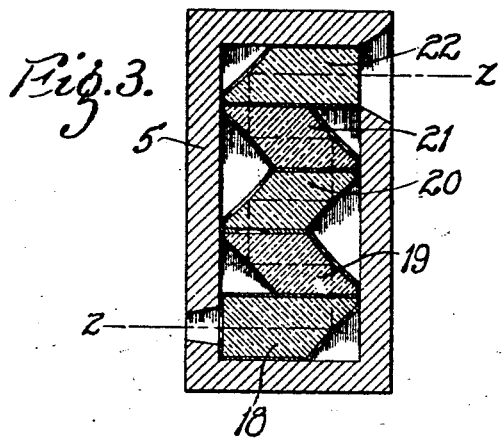
INVENTOR
HARRY F. ROACH,
BY
ATTORNEY

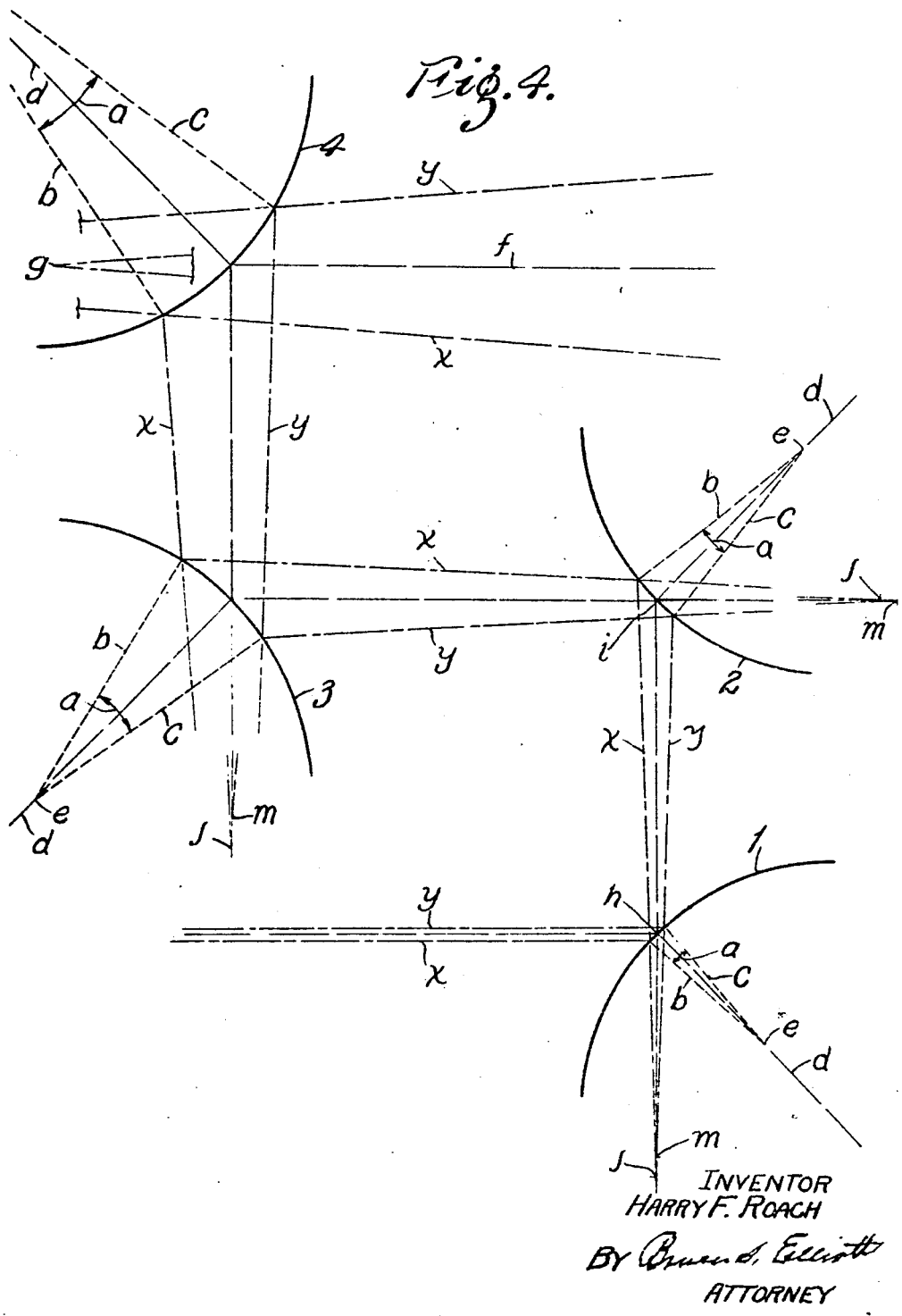

Patented Apr. 20, 1926.

1,581,659

UNITED STATES PATENT OFFICE.

HARRY F. ROACH, OF ST. LOUIS, MISSOURI.

ANAMORPHOUS TOTAL-REFLECTING PRISM.

Application filed June 27, 1924. Serial No. 722,744.

*To all whom it may concern:*

Be it known that I, HARRY F. ROACH, a citizen of the United States, residing in the city of St. Louis and State of Missouri, have invented new and useful Improvements in Anamorphous Total-Reflecting Prisms, of which the following is a specification.

This invention relates to the art of producing balanced anamorphous images by the reflection of light rays, and has for its general object the provision of an optical instrument in connection with an appropriate lens or optical system, in the use of which a true anamorphous image may be produced with the screen at any distance from the instrument.

The invention is characterized by the arrangement in such an instrument of two or more pairs of curved reflecting surfaces afforded by anamorphous prisms, preferably of the total reflecting type, in which the product of reflection of one pair of the reflecting surfaces of the prisms, properly related to each other, is received and reflected by the other pair of reflecting surfaces, also properly related to each other, in a manner to balance the light rays. The angle of incidence of the optical axis plane may be of any angle of selection, provided this angle is the same at all reflecting surfaces of the same instrument. The reflecting surfaces are preferably covered with silver or some other reflecting medium.

In stating that the prisms are properly related to each other, I refer, among other things, to such relative positions of the prisms and to such scientific proportioning of the curved surfaces thereof as will result in successive projections and transpositions of any two incident parallel symmetrical light rays, which originally are located at equal distances from the optical axis plane, so that an arc of impingement as between these rays on the respective curved reflectors will be such as to subtend substantially the same angle at all curved reflectors. The angle referred to is that described by two intersecting radii passing through the respective points of impingement of the light rays at the respective curved surfaces. When the above conditions are satisfied, the final projection of the light rays will be substantially in exact balance.

Involved in the invention is a novel method of successively reflecting light rays to produce a balanced anamorphous image.

While I have referred above to the use of two pairs of anamorphous reflecting prisms, any multiple of four prisms may be employed, if desired.

The distinguishing features of the invention reside, first, in the use of pairs of curved reflectors positioned with reference to each other so that the order of incidence of the light rays impinging upon the first reflector will be reversed when impinging on the third reflector, thereby permitting the light rays to be projected from the fourth reflector so that the two symmetrical rays will be substantially in exact balance; second, in proportioning the curved surfaces of the reflectors relative to each other, effected by a successive increase in the radii thereof; third, where a further refinement of work is necessary, in the use of conic sections for the cylinders in place of circles; and, fourth, in dispensing entirely with the use of flat reflecting surfaces, thereby greatly diminishing the absorption of light rays in the process of reflection.

In the practice of the method involved in my invention, the light rays are projected according to the principal characteristic of the invention, that is to say, any two parallel symmetrical rays impinging upon the first curved reflecting surface are reflected in such manner that two lines drawn perpendicular to a tangent passing through the point of impingement of each ray on the respective cylinders will intersect at the same point on the axis of each cylinder, and thereby describe an angle, and the angle formed by these two lines will be substantially constant and the same throughout the successive reflections.

In order that the invention may be clearly understood, I have illustrated in the accompanying drawings, the type of optical instrument I employ for practicing the same, and diagrammatically, the method of successively reflecting light rays from four curved reflecting surfaces or prisms.

In these drawings—

Figure 1 is a cross-sectional view of an optical instrument having three total reflecting prisms mounted therein, affording four curved reflecting surfaces;

Figure 2 is a view in front elevation thereof;

Figure 3 is a view similar to Figure 1, but showing five total reflecting prisms affording eight reflecting surfaces; and Figure 4 is a diagrammatic view illustrating the arrangement of the prisms or reflecting surfaces according to my invention, and showing the method of reflecting light rays according to my invention, for which purpose the successive reflection of two parallel symmetrical rays are illustrated.

Referring first to Figure 4 of the drawings, the numerals 1, 2, 3 and 4 indicate four curved reflecting surfaces, the same being shown as conic sections, and of which the radii of the cylinders 2, 3 and 4 are successively greater than the radius of the cylinder 1. The angularity of the axes of the four reflecting surfaces relative to the optical axis plane at each surface is the same and, as shown, is that of forty-five degrees to the horizontal. These cylinders are so disposed that a beam of light impinging upon the first cylinder 1 will be successively reflected upon and by the cylinders 2, 3 and 4, the latter making the final projection. These four projections are necessary in order, first, that the final projection may be in the same direction as that in which the rays are directed on the first cylinder, and thus obviate the objection of interposing the object from which the light is initially reflected, in any part of the field of reflection; and, secondly, to produce a balance of the light rays. Thus, taking the rays indicated by X and Y as being two parallel symmetrical light rays reflected from an image upon the cylinder 1, it will seen that these rays occupy a reversed position, as to order, as reflected from the cylinder 2. These rays are reflected from the cylinder 3 also in the reverse position from which they were reflected from the cylinder 1, and hence when reflected from the cylinder 4, will have their symmetrical position restored or adjusted to that which they occupied when impinging upon the cylinder 1.

As stated above, the reflection of the rays is effected under conditions, governed by the angular disposition and curvilinear formation of the cylinders, which will effect a certain constant angular relation of the radii of the cylinder passing through the points of impingement of the rays throughout the successive reflections. This constant is a subtended angle of the impinging rays upon the reflecting surfaces, and is indicated, as to each reflector, by the letter $a$. This angle is produced in each case by projecting lines $b$ and $c$ backward perpendicular to tangents of the cylinder passing through the point of impingement of the respective rays on the cylinders, which lines will intersect the axis $d$ of the cylinder at the same point $e$. This angle $a$ is of constant and substantially of the same value at all four cylinders. Under these conditions, the rays X and Y will be projected from the final cylinder 4 at substantially equal angles to the optical axis plane $f$ and, when projected back, will intersect the same at substantially the same point $g$.

By producing a reflection of the rays in the manner described, the distance between the reflectors is not fixed, and final practical limitations of this distance may be of any selection and produce the desired results, provided the angle $a$ at all cylinders is substantially the same; and the constant angle $a$ is insured by reason of the fact that the radii of the respective cylinders is made different, or successively increased, to cause the successive projection of the light rays at such desired angle.

When the above conditions are satisfied, the perpendicular dimension from the optical axis plane of the image that may be reflected by the final cylinder at any distance therefrom, will be substantially proportionally the same for any two symmetrical rays of origin.

Thus, I am enabled to produce a true anamorphous image with the screen at any distance from the instrument.

The successive reflections of the rays to produce the subtended angle $a$ of constant value as to any two symmetrical rays of origin reflected is controlled by the relation of the extent of impingement of the rays to the length of the radius of the cylinder. The length of the radius of each cylinder after the first, is determined by projecting the rays X and Y back to intersect the optical axis plane, and applying the formula: The mean distance between their points of intersection $l$ and $m$ with the said plane and the optical center $h$ of the first cylinder, divided by the mean distance between the points of intersection of the said rays with the optical axis plane and its impingement with the optical center $i$, equals the radius of the first reflector divided by the radius of the second reflector.

The above description applies to a construction and arrangement of reflectors and a method of reflecting light rays thereby in accordance with the exact science involved. It should be stated, however, that, other conditions, herein set forth, being maintained, the cylinders may be circles instead of conic sections, provided the rays impinge each cylinder within the paraxial zone, and that, for practical purposes, the radii of the cylinders may be, in most cases, the same throughout, as the element of error is so small as to be negligible for some character of work.

Referring now to Figures 1 and 2 of the drawings, I have illustrated a construction of instrument designed for reflecting light rays according to my invention. In these views, the numeral 5 indicates a casing, in which are located three total reflecting prisms 6, 7, and 8, affording curved reflecting surfaces 9, 10, 11, and 12. The casing 5 may be of any desired length, and is provided at one side near its bottom with an entrance slot or opening 13, and at its opposite side with an outlet opening 14, located near the top of the instrument. The prisms 6, 7, and 8 are covered with flat black, except at the reflecting surfaces at suitable points where the coating is omitted to provide the optical openings 15, 16, and 17 for the passage of the light rays through the prisms, and at the exit side of the final prism.

In Figure 3, I have shown an optical instrument employing five total reflecting prisms, indicated, respectively, by the numerals 18, 19, 20, 21, and 22, presenting eight curved reflecting surfaces. In both Figures 1 and 3, the path of the light rays entering the instrument and as reflected by the various curved surfaces of the total reflecting prisms, is indicated by the dotted line Z, and is herein termed the optical axis plane. Figures 1 and 3 will serve to illustrate the fact that two pairs, or any multiple of two pairs, of curved reflecting surfaces can be employed in the practice of my invention.

It will be understood that as the relative magnification increases directly as the distance of the plane of the image from the instrument, any relative magnification may be obtained that is desirable. The relative magnifying power of the instrument may be increased either by reducing the radii of the cylinders or by increasing the number of pairs of total reflecting prisms. For example, as to the latter means, it will be apparent that the instrument shown in Figure 3 will have a greater relative magnifying power than the instrument shown in Figure 1.

My invention is applicable for use in any connection where it is desirable to produce an enlarged image of an object having a very high degree of magnification of all dimensions in one direction, or parallel with a given axis. The instrument may also be used to perform the function of a microscope, in which the magnification occurs in one direction. It should also be understood that, in the use of my improved instrument, the same may be reversed in position with reference to the lens system, if desired, and the same instrument may be utilized as an objective or a projective instrument.

Finally, I would state, while the invention is not limited in its application, it will, perhaps, find its widest application in observing distortions produced in a body, such as a piece of metal, when the latter is subjected to a load, or by producing a photographic image of such distortion, as evidenced, for example, by the bending of a line drawn on the body, and deducing mathematically the bending moment, strain, stress, or the like, of the material investigated.

I claim:

1. An optical instrument, comprising a plurality of pairs of curved reflecting surfaces angularly disposed to successively reflect light rays from a source, the angularity of the axes of all the reflecting surfaces relative to the optical axis plane at each surface being the same.

2. An optical instrument, comprising a plurality of pairs of curved reflecting surfaces angularly disposed to successively reflect light rays from a source, the angularity of the axes of all the reflecting surfaces relative to the optical axis plane at each surface being the same, and the radii of the respective surfaces being successively increased from the first to the final surface.

3. An optical instrument, comprising a plurality of pairs of curved reflecting surfaces, having such angular disposition of their axes and length of radii as to maintain a constant subtended angle of any two parallel symmetrical rays of origin successively reflected by the surfaces.

4. An optical instrument, comprising a plurality of pairs of curved surfaces of the shape of conic sections and angularly disposed to successively reflect light rays from a source, the angularity of the axis of all of the surfaces relative to the optical axis plane at each surface being the same.

5. An optical instrument, comprising a plurality of pairs of curved reflecting surfaces of the shape of conic sections and angularly disposed to successively reflect light rays from a source, the radii of the respective surfaces being successively increased in length from the first to the final surface.

6. An optical instrument, comprising a plurality of pairs of curved reflecting surfaces, the angularity of the axes of all of the reflecting surfaces of which with reference to the optical axis plane at each reflecting surface being the same, and in which the radius of each cylinder after the first is determined by projecting the rays of reflection of two parallel rays of origin back to intersect the optical axis plane and applying the formula: the mean distance between the points of intersection of said reflected rays with the said plane and the optical center of the first cylinder of selection divided by the mean distance between the points of intersection of the said reflected rays with the optical axis plane and its impingement with the optical center of the next cylinder in order, equals the radius of the first reflector divided by the radius of the second reflector.

In testimony whereof, I have hereunto set my hand.

HARRY F. ROACH.